United States Patent [19]
Tamura et al.

[11] 3,770,020
[45] Nov. 6, 1973

[54] INTERFACE DETECTOR

[75] Inventors: Kohzoh Tamura, Chigasaki; Shigetoshi Matsuno, Yokohama, both of Japan

[73] Assignee: Kabushiki Kaisha Tokyo Keiki (Tokyo Keiki Co. Ltd.), Tokyo, Japan

[22] Filed: May 2, 1972

[21] Appl. No.: 249,499

[30] Foreign Application Priority Data
May 13, 1971 Japan.............................. 46/32097
May 22, 1971 Japan.............................. 46/35085

[52] U.S. Cl.............. 137/802, 324/61 R, 73/304 C, 137/487.5
[51] Int. Cl............................................ G01r 27/26
[58] Field of Search...................... 137/487.5, 93, 5, 137/551, 802; 73/290, 304 C; 324/61; 340/16; 181/5

[56] References Cited
UNITED STATES PATENTS
| | | |
|---|---|---|
| 2,577,612 | 12/1951 | Fay .................................... 324/61 D |
| 2,985,826 | 5/1961 | Fluegel.............................. 324/61 R |
| 3,255,411 | 6/1966 | Norwich............................ 324/61 R |
| 3,621,263 | 11/1971 | Gilson.......................... 137/487.5 X |

*Primary Examiner*—Henry T. Klinksiek
*Assistant Examiner*—Robert J. Miller
*Attorney*—Carlton Hill

[57] ABSTRACT

An interface detector having a common supply pipe through which different kinds of liquids are supplied, at least two detecting devices mounted on the pipe, at least two electric circuits supplied with signals from the detecting devices and delivering corresponding signals, and electric circuits connected to be supplied with the corresponding signals from the first mentioned electric circuits and generating output signals.

6 Claims, 3 Drawing Figures

United States Patent [19]
Tamura et al.
[11] 3,770,020
[45] Nov. 6, 1973
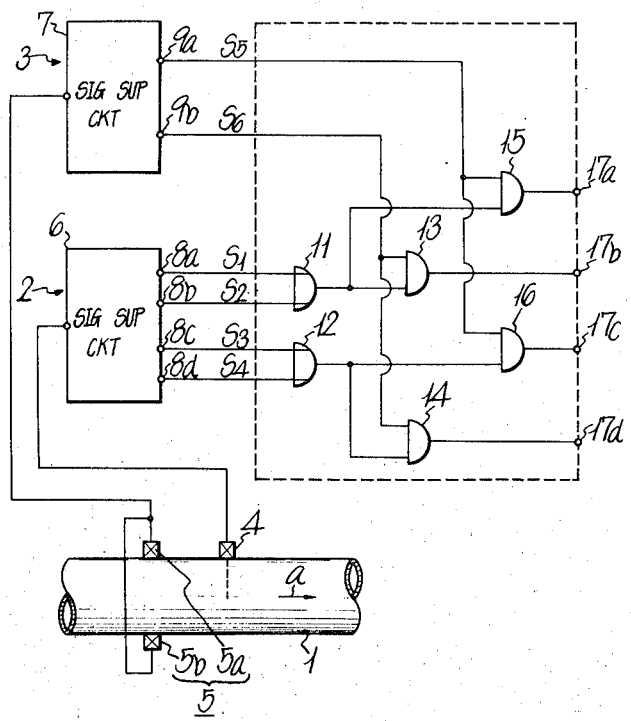

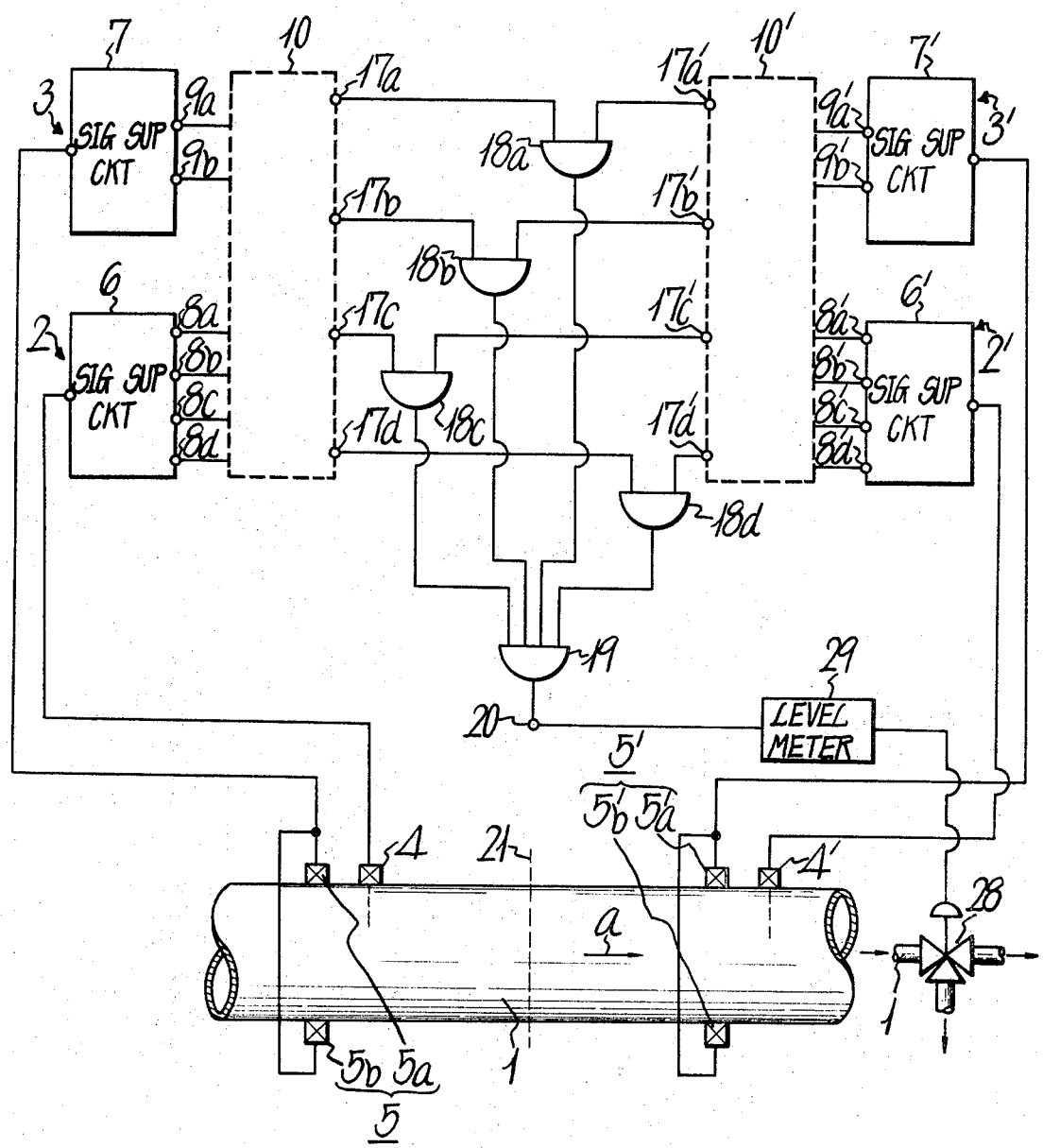

INTERFACE DETECTOR

BACKGROUND OF THE INVENTION

1. Field of the Invention

This invention relates to an interface detector and more particularly to an apparatus for detecting a boundary between liquids of different kinds flowing through a common pipe.

2. Description of the Prior Art

There has been proposed an interface detector or an apparatus for detecting a boundary between liquids of different kinds in which a pair of ultrasonic wave transmitting and receiving elements are fixed within a common pipe through which liquids flow, a velocity of an ultrasonic wave transmitting through the liquids flowing within the common pipe is measured and a boundary between liquids of different kinds is detected based upon the fact that the velocity of the ultrasonic wave differs in accordance with a kind of a liquid through which the ultrasonic wave passes.

There has also been proposed another type of such an apparatus or an interface detector in which an element is provided in association with a common pipe through which liquids flow for measuring dielectric constants of the liquids and a boundary beween the liquids of different kinds is detected based upon the fact that liquids have different dielectric constants according to their kinds.

In fact, dielectric constants of liquids such, for example, as regular gasoline, kerosene, high-octane gasoline and light oil and velocities of ultrasonic wave transmitting through such liquids are given by the following table.

TABLE

| Kind of Liquid | Dielectric Constant | Velocity of Ultrasonic Wave |
|---|---|---|
| Regular Gasoline | 2.02~2.07 | 1100~1200 m/sec. |
| Kerosene | 2.07~2.10 | 1250~1350 m/sec. |
| High-octane Gasoline | 2.10~2.15 | 1100~1200 m/sec. |
| Ligh Oil | 2.14~2.23 | 1250~1350 m/sec. |

As apparent from the table, the second mentioned type apparatus employing the element for measuring dielectric constants of liquids can not positively detect a boundary between the regular gasoline and the kerosene, a boundary between the kerosene and the high-octane gasoline and also a boundary between the high-octane gasoline and the light oil.

Meantime, it may be also understood that the first mentioned type apparatus employing ultrasonic wave transmitting and receiving elements can not detect positively a boundary between the regular and high-octane gasolines and also a boundary between the kerosene and the light oil.

SUMMARY OF THE INVENTION

Accordingly, an object of this invention is to provide an interface detector or an apparatus for detecting a boundary between liquids of different kinds flowing through a common pipe free from the drawbacks encountered in the prior art.

Another object of the invention is to provide an apparatus for detecting a boundary between liquids of different kinds with high accuracy and reliability.

BRIEF DESCRIPTION OF THE DRAWING

FIG. 3 is a block diagram for showing still another embodiment of the invention.

DESCRIPTION OF THE PREFERRED EMBODIMENTS

Figure 1:
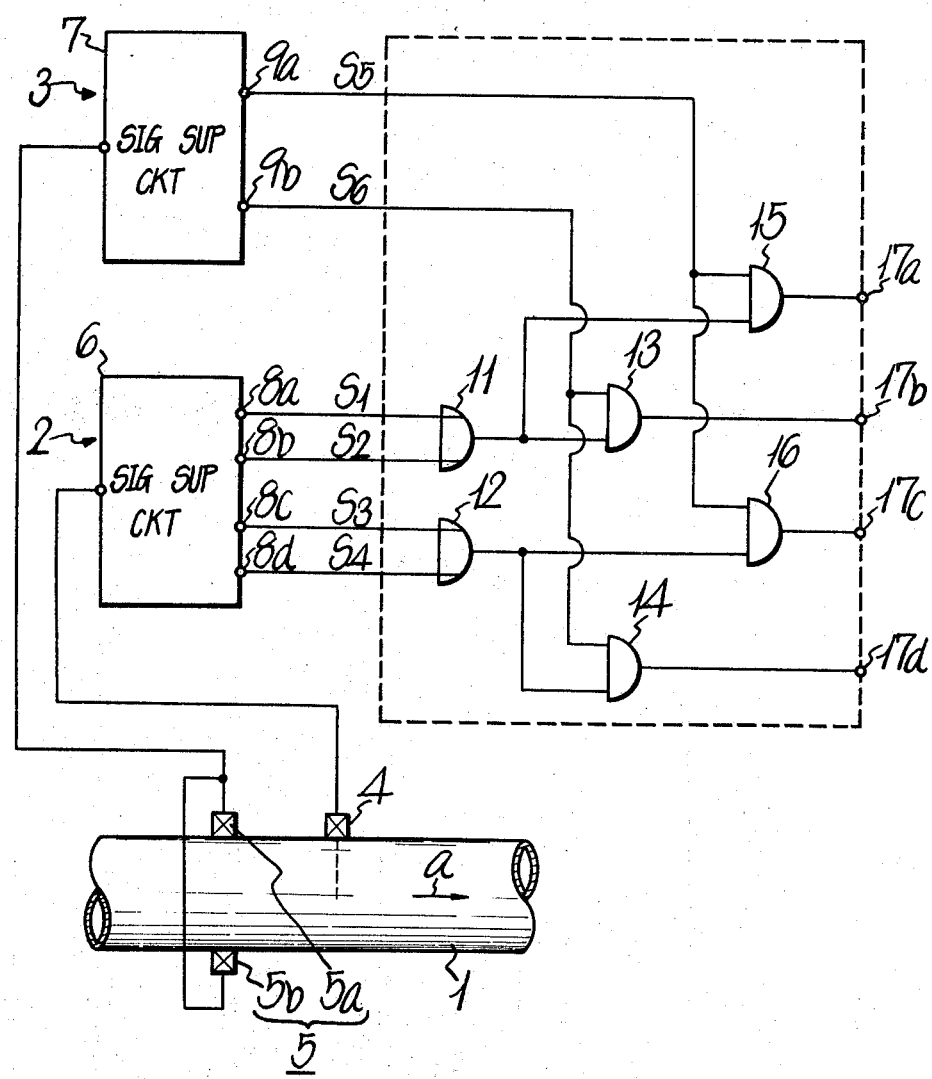
FIG. 1 is a block diagram for illustrating an embodiment of the invention.

FIG. 1 shows one embodiment of an interface detector or an apparatus for detecting a boundary or boundary layer between liquids of different kinds. In the figure, reference numeral 1 designates a common pipe through which liquids of different kinds are successively supplied or fed. On the common pipe 1 detecting elements 4 and 5 are mounted. One of the detecting element, for example, 4 is for measuring a dielectric constant of a liquid flowing through the pipe 1, while the other detecting element 5 is for measuring a velocity of an ultrasonic wave in the liquid flowing through the pipe 1 and consists of an ultrasonic wave transmitting element 5a and an ultrasonic wave receiving element 5b. The output signals obtained from the detecting elements 4 and 5 are respectively supplied to input sides of corresponding measuring units 2 and 3. In this case, the output signals of the detecting elements 4 and 5 are such ones as correspond to the dielectric constant of the liquid flowing through the pipe 1 and the velocity of the ultrasonic wave transmitted through the liquid.

The measuring unit 2 includes a signal supply circuit 6 which has provided with four output terminals 8a, 8b, 8c and 8d, while the measuring unit 3 includes a signal supply circuit 7 which has provided with two output terminals 9a and 9b.

In the invention, as the measuring units 2 and 3 those well known to those skilled in the art are employed, so that their detailed description is omitted for the sake of brevity. However, the measuring unit 3 of the invention is such one as detecting a velocity of ultrasonic wave in a liquid based upon a so-called ring-around manner. The ultrasonic wave transmitting element 5a and the ultrasonic wave receiving element 5b are mounted, for example, on the pipe 1 in such a manner that a path, along which the ultrasonic wave emitted from the element 5a travels to the element 5b through the liquid in the pipe 1, intersects a flow direction $a$ of the liquid in the pipe 1 substantially at right angles thereto. Accordingly, in practice the velocity of the ultrasonic wave travelling through the liquid in the pipe 1 is not affected any by variations of the velocity of the liquid flowing within the pipe 1.

One example of the dielectric constant detecting element will be also described briefly. It consists of outer and inner electrodes and its detecting part is immersed in a liquid which is detected in dielectric constant. In this case, the liquid is charged between the outer and inner electrodes of the detecting element to change electrostatic capacity between the electrodes of the detecting element. Thus the dielectric constant of the charged liquid is obtained based upon the electrostatic capacity.

According to the measuring unit 3 with the ultrasonic wave transmitting and receiving elements 5a and 5b arranged in the manner mentioned above, a frequency of the output signal therefrom, namely a so-called singaround frequency is not affected by characteristics of circuits employed in the unit 3, so that a signal, the frequency of which surely corresponds to the velocity of the liquid flowing in the pipe 1, can be positively obtained.

It is also well known that the measuring unit 2 which measures dielectric constants of liquids flowing in the pipe 1 can produce output signals corresponding to the dielectric constants of the liquids.

The signal supply circuit 6 of the measuring unit 2 provides signals $S_1$ and/or a signal $S_2$ at its output terminals $8a$ and/or $8b$ when a liquid flowing in the pipe 1 is, for example, a regular gasoline; the signals $S_2$ and/or signal $S_1$ at its output terminals $8b$ and/or $8a$ when a kerosene, by way of example, flows in the pipe 1; signals $S_2$, $S_3$ and/or $S_4$ at its output terminals $8b$, $8c$ and/or $8d$ when a high-octane gasoline, for example, flows in the pipe 1; and signals $S_3$ and/or $S_4$ at its output terminals $8c$ and/or $8d$ when a light oil, for example, flows in the pipe 1. Meanwhile, the signal supply circuit 7 of the measuring unit 3 provides a signal $S_5$ at its output terminal $9a$ when a velocity of an ultrasonic wave travelling through a liquid in the pipe 1 is 1100 ~ 1200 m/sec. and a signal $S_6$ at its output terminal $9b$ when the velocity of the ultrasonic wave travelling through a liquid in the pipe 1 is 1250 ~ 1350 m/sec.

The output signals obtained at the output terminals $8a$, $8b$, $8c$, $8d$, $9a$ and $9b$ are respectively supplied to a logical circuit 10 surrounded by a dotted line block in FIG. 1. The logical circuit 10 consists of, for example, two OR-circuits 11 and 12 and four AND-circuits 13, 14, 15 and 16 and has four output terminals $17a$, $17b$, $17c$ and $17d$. The output terminals $8a$ and $8b$ of the circuit 6 are connected to the input sides of the OR-circuit 11 and the output terminals $8c$ and $8d$ of the circuit 6 are connected to the input sides of the OR-circuit 12, while the output terminal $9a$ of the circuit 7 is connected to one input terminals of the AND-circuits 15 and 16 respectively and the other output terminal $9b$ of the circuit 7 is connected to one input terminals of the AND-circuits 13 and 14. The output terminal of the OR-circuit 11 is connected to the other input terminals of the AND-circuits 13 and 15 respectively, while the output terminal of the OR-circuit 12 is connected to the other input terminals of the AND-circuits 14 and 16 respectively. The output terminals of the AND-circuits 15, 13, 16 and 14 are respectively led to the output terminals $17a$, $17b$, $17c$ and $17d$ of the logical circuit 10.

A description will be hereinbelow given on the operation of such an apparatus mentioned above. If a liquid flowing through the pipe 1 at the positions corresponding to those of elements 4 and 5 is a regular gasoline, the signal supply circuit 6 of the measuring unit 2 provides signals $S_1$ and/or $S_2$ at its output terminals $8a$ and/or $8b$, so that the OR-circuit 11 provides an output signal which is then supplied to the AND-circuits 13 and 15 respectively, while the signal supply circuit 7 of the measuring unit 3 provides the signal $S_5$ at its output terminal $9a$. The output signal $S_5$ is supplied to the AND-circuits 15 and 16 respectively. As a result of this, the logical circuit 10 delivers an output signal at its output terminal $17a$. When a signal is derivered from the output terminal $17a$ of the logical circuit 10, it is meant that the liquid flowing through the pipe 1 is a regular gasoline in this example.

Meanwhile, if a liquid flowing through the pipe 1 at the positions of the elements 4 and 5 is a light oil, the logical circuit 10 provides a signal at its output terminal $17d$, because in such a case the signal supply circuit 6 of the measuring unit 2 delivers at its output terminal $8c$ and/or $8d$ the signals $S_3$ and/or $S_4$ which are supplied to the OR-circuit 12. The OR-circuit 12 supplys a signal to the AND-circuits 14 and 16 respectively. Similarly, in such a case the signal $S_6$ is derived from the output terminal $9b$ of the signal supply circuit 7 of the measuring unit 3 and is supplied to the AND-circuits 13 and 14 respectively, so that an output signal is delivered from the output terminal $17d$ of the logical circuit 10 which is connected to the output terminal of the AND-circuit 14. When the logical circuit 10 delivers an output signal at its output terminal $17d$, the liquid flowing through the pipe 1 is a light oil in this example.

Similarly, when liquids flowing through the pipe 1 are kerosene and a high-octane gasoline, the logical circuit 10 derives at its output terminals $17b$ and $17c$ output signals respectively to show the kinds of liquids flowing through the pipe 1.

As described above, with the present invention the kind of liquid flowing through the pipe 1 is positively detected, so that a boundary or boundary layer between the adjacent two liquids of different kinds can be detected without failure.

Figure 2:
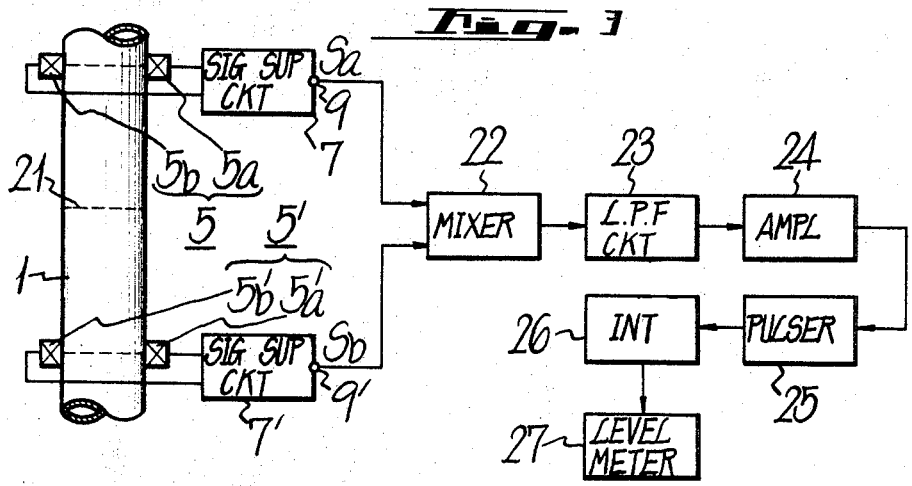
FIG. 2 is a block diagram for showing another embodiment of the invention.

FIG. 2 shows another embodiment of this invention. In this embodiment, two sets of the elements described in connection with the embodiment shown in FIG. 1 are employed, so that one set of elements are shown with reference numerals or characters same to those employed in FIG. 1 and the other set of elements are shown by similar reference numerals or characters with dashes.

In the embodiment of FIG. 2, detecting elements $4'$ and $5'$ including ultrasonic wave transmitting and receiving elements $5a'$ and $5b'$ are mounted on the common pipe 1 with a predetermined space or distance with respect to the detecting elements 4 and 5. In the embodiment of the figure, the elements $4'$ and $5'$ are disposed on the pipe 1 downstream of the elements 4 and 5. The output terminals $17a$ and $17a'$ of the logical circuits 10 and $10'$ are connected to an AND-circuit $18a$, the output terminals $17b$ and $17b'$ to an AND-circuit $18b$, the output terminals $17c$ and $17c'$ to an AND-circuit $18c$ and the output terminals $17d$ and $17d'$ to an AND-circuit $18d$ respectively. All of the output terminals of the AND-circuits $18a$ to $18d$, inclusive, are connected to an OR-circuit 19 which constitutes a logical circuit and has an output terminal 20.

As explained in connection with the embodiment shown in FIG. 1, when a same liquid such as a regular gasoline, a kerosene, a high-octane gasoline or a light oil flows in the pipe 1 at the both positions where two sets of the elements 4, 5 and $4'$, $5'$ are positioned, signals are delivered at a pair of the output terminals $17a$ and $17a'$, $17b$ and $17b'$, $17c$ and $17c'$ or $17d$ and $17d'$. Accordingly, in such a case the OR-circuit 19 produces an output signal at its output terminal 20, which will mean that a same kind of liquid is supplied through the pipe 1.

When different kinds of liquids such as a regular gasoline in the right hand side and a kerosene in the left hand side of a plane 21 in the figure are supplied through the pipe 1, in other words, a boundary or boundary layer between the regular gasoline and the kerosene arrives at the plane shown by a dotted line 21 in the figure which is positioned between the two sets of the elements 4, 5 and 4', 5', the logical circuit 10 provides an output signal at its output terminal 17b only, while the logical circuit 10' provides an output signal at its output terminal 17a' only. Accordingly, in such a case any one of the AND-circuits 18a to 18d delivers no signal and consequently the OR-circuit 19 also delivers no signal at the output terminal 20. Accordingly, the boundary or the boundary layer of different kinds of liquids is immediately detected when it just passed over the first set of the detecting elements 4 and 5 by observing the output signal of the OR-circuit 19.

In general, since it is measured that a boundary or boundary layer between different kinds of liquids has a predetermined length or width in the pipe 1, the distance between two sets of the detecting elements 4, 5 and 4', 5' may be selected enough to bring the boundary layer between them.

The embodiments shown in FIGS. 1 and 2 employ two different kinds of detecting elements such as the ultrasonic wave type and dielectric constant type ones. However, one of them can be dispensed with.

FIG. 3 shows a still another embodiment of this invention in which ultrasonic wave type detecting elements, for example, are used only and reference numerals or characters similar to those of FIG. 2 are employed to show the similar elements. In this embodiment the signal supply circuits 7 and 7' have output terminals 9 and 9'. Output signals Sa and Sb appearing at the output terminals 9 and 9' have frequencies corresponding to velocities of liquids flowing through the pipe 1 at the lines connecting the ultrasonic wave transmitting and receiving elements 5a and 5b, 5a' and 5b' similar as in the foregoing embodiments.

Accordingly, it will be apparent that when the frequencies of both the signals Sa and Sb from the output terminals 9 and 9' are different with each other, a liquid flowing in the pipe 1 at one line connecting, for example, elements 5a and 5b differs from that at the other line connecting the elements 5a' and 5b', in other words, the boundary layer is between the two lines.

For this purpose, in this embodiment the output signals Sa and Sb are respectively supplied to a mixer circuit 22. The output signal of the mixer circuit 22, which is a difference between the signals Sa and Sb or beat signal therebetween, is supplied to a low-pass filter circuit 23 which is formed in such a manner that the frequency of the beat signal is positioned in the plain portion (other than inclined portion) of its characteristic curve and the signals Sa and Sb themselves can not pass through it. The output signal from the low-pass filter circuit 23 is supplied to a pulser 25 through an amplifier 24, if desired. The pulser 25 generates a pulse with a predetermined width at every time when the signal from the amplifier 24 intersects a zero level, by way of example. The output signal from the pulser 25 is supplied to an integrator circuit 26 to provide a DC output signal which is then applied to a DC level meter 27.

In the foregoing example, the beat signal between the signals Sa and Sb is obtained. However, it may be possible that the signals Sa and Sb are applied to a counter circuit to count frequencies thereof. With such a case, if there is a difference between the frequencies of the two signals Sa and Sb, a boundary exists between the two sets of detecting elements, while if no difference is detected the same liquid flows through the common pipe 1 at the positions where the two sets of detecting elements are positioned.

In the embodiment shown in FIG. 3, it may be possible that dielectric constant type measuring elements or other type detecting elements can be employed in stead of the ultrasonic wave type elements 5 and 5' with the same effect.

It can be possible, for the case where liquid passing through the pipe changes in temperature, to employ temperature compensating device in connection with, for example, the signal supply circuits 6 and 7 so as to avoid the influences by the temperature change of the liquid on the indication.

In FIG. 2, reference numeral 28 is a three-way valve mounted in the pipe 1 at its outlet. The three-way valve 28 is controlled by the output of the OR-circuit 19 through, for example, a level meter 29 to automatically control the flow direction of the liquid passed therethrough to tanks not shown.

It will be apparent that many modifications and variations can be made without departing from the scope of the novel concepts of the present invention.

We claim as our invention:

1. An interface detector comprising a common supply pipe through which different kinds of liquids are supplied, at least two detecting means mounted on said pipe, at least two electric circuits supplied with signals from said detecting means and delivering corresponding signals, and a circuit means supplied with said corresponding signals from said electric circuits and generating signals.

2. An interface detector as claimed in claim 1 in which said at least two detecting means are two detecting means of same kind.

3. An interface detector as claimed in claim 2 in which said detecting means consist of ultrasonic wave transmitting and receiving elements.

4. An interface detector as claimed in claim 1 in which said two detecting means are different in kind and said circuit means includes two OR-circuits supplied with output signals from one of said electric circuits and four AND-circuits supplied with output signals from the other of said electric circuits, an output signal from one of said OR-circuits being supplied to two of said four AND-circuits, while output signal from the remaining OR-circuit being supplied to the remaining AND-circuits.

5. An interface detector as claimed in claim 4 further includes another set of a similar circuit system defined in claim 4, in which the detecting elements of said another set of circuit systems are mounted on said pipe spaced from the detecting elements of said first-mentioned circuit system and output signal from said two sets of circuit systems are applied to a logical circuit.

6. An interface detector as claimed in claim 5 in which an output signal from said last-mentioned logical circuit is employed through an electric circuit to control a valve inserted into said pipe at its outlet.

* * * * *